(12) United States Patent
Chung et al.

(10) Patent No.: US 8,904,398 B2
(45) Date of Patent: Dec. 2, 2014

(54) HIERARCHICAL TASK MAPPING

(75) Inventors: I-Hsin Chung, Chappaqua, NY (US);
David J. Klepacki, New Paltz, NY (US);
Che-Rung Lee, PingTung (TW);
Hui-Fang Wen, Chappaqua, NY (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 13/413,286

(22) Filed: Mar. 6, 2012

(65) Prior Publication Data

US 2012/0254879 A1 Oct. 4, 2012

Related U.S. Application Data

(60) Provisional application No. 61/470,232, filed on Mar. 31, 2011.

(51) Int. Cl.
*G06F 15/76* (2006.01)
*G06F 9/46* (2006.01)
*G06F 15/173* (2006.01)
*G06F 9/50* (2006.01)

(52) U.S. Cl.
CPC .................................. *G06F 9/5066* (2013.01)
USPC ............. 718/102; 718/104; 718/105; 712/12; 712/13; 709/226

(58) Field of Classification Search
CPC ................................................... G06F 9/4881
See application file for complete search history.

(56) References Cited

U.S. PATENT DOCUMENTS

| | | | |
|---|---|---|---|
| 6,292,822 B1 * | 9/2001 | Hardwick ..................... | 718/105 |
| 6,456,996 B1 * | 9/2002 | Crawford et al. ..................... | 1/1 |
| 8,127,300 B2 * | 2/2012 | Arimilli et al. ............... | 718/105 |
| 2006/0101104 A1 * | 5/2006 | Bhanot et al. .................. | 708/105 |
| 2006/0112297 A1 * | 5/2006 | Davidson .......................... | 714/2 |
| 2007/0255836 A1 * | 11/2007 | Takahashi et al. ............. | 709/226 |
| 2009/0031316 A1 * | 1/2009 | Richoux ....................... | 718/102 |
| 2009/0328047 A1 * | 12/2009 | Li et al. .......................... | 718/102 |
| 2011/0258629 A1 * | 10/2011 | Dantzig et al. ................ | 718/100 |
| 2011/0321056 A1 * | 12/2011 | Branson et al. ................ | 718/105 |
| 2012/0102500 A1 * | 4/2012 | Waddington et al. .......... | 718/104 |
| 2012/0174117 A1 * | 7/2012 | Jula et al. ....................... | 718/105 |

OTHER PUBLICATIONS

Adiga et al., "IBM Research Report—An Overview of the BlueGene/L Supercomputer", RC22570 (WO209-033) Sep. 10, 2002.*

Moon et al., Analysis of the Clustering Properties of the Hilbert Space-Filling Curve, IEEE Transactions on Knowledge and Data Engineering, vol. 13, No. 1, Jan. 2001.*

Kaddoura et al., "Partitioning Unstructured computational graphs for nonuniform and adaptive environments", IEEE, Fall 1995.*

Chung et al., "Automated Mapping of Regular Communication Graphs on Mesh Interconnects,", IEEE, 2010.*

(Continued)

*Primary Examiner* — Lewis A Bullock, Jr.
*Assistant Examiner* — Kevin X Lu
(74) *Attorney, Agent, or Firm* — Scully, Scott, Murphy & Presser, P.C.; Daniel P. Morris, Esq.

(57) ABSTRACT

Mapping tasks to physical processors in parallel computing system may include partitioning tasks in the parallel computing system into groups of tasks, the tasks being grouped according to their communication characteristics (e.g., pattern and frequency); mapping, by a processor, the groups of tasks to groups of physical processors, respectively; and fine tuning, by the processor, the mapping within each of the groups.

24 Claims, 4 Drawing Sheets

(56) References Cited

OTHER PUBLICATIONS

Rami G. Melhem et al., "Embedding Rectangular Grids into Square Grids with Dilation Two", IEEE Transactions on Computers, vol. 39, No. 12, Dec. 1990, pp. 1446-1455.

John A. Ellis, "Embedding Rectangular Grids into Square Grids" IEEE Transactions on Computers, vol. 40, No. 1 Jan. 1991, pp. 46-52.

Moore et al., "Transactions of the American Mathematical Society", American Mathematical Society, vol. 1, No. 1, Jan. 1900, pp. 72-90.

Hao Yu, et al. "Topology Mapping for Blue Gene/L Supercomputer" Proceedings of the 2006 ACM/IEEESC/OC Conference, Nov. 2006, Tampa, Florida, US.

Masood Ahmed, et al. "Mapping with Space Filling Surfaces" IEEE Transactions on Paralelle and Distributed Systems vol. 18, No. 9 Sep. 2007 pp. 1258-1269.

G. Bhanaot et al. "Optimizing task layout on the Blue Gene/L supercomputer" IBM J Res vol. 49, No. 23 Mar./May 2005.

Sangman Moh et al. "Mapping Strategies for Switch-Based Cluster Systems of Irregular Topology" Parallel and Distributed Systems, 2001. ICPADS 2001. Proceedings. Eighth International Conference on Jun. 26-29, 2001 Kyongju City, South Korea.

Jesper Larsson Traff, "Implementing the MPI Process Topology Mechanism" C&C Research Laboratories, Proceedings of the ACM/IEEE Conference on Supercomputing, 2002.

Abhinav Bhatele et al. "A Case Study of Communication Optimizations and 3D Mesh Interconnects" Deptmart of Computer Science, Urbana II. US, Aug. 2009.

Richard W. Vuduc and Hyun-Jin Moon "Fast sparse matrix-vector multiplication by exploiting variable block structure" Lawrence Livermore National Lab/University of California, Jul. 5, 2008.

\* cited by examiner

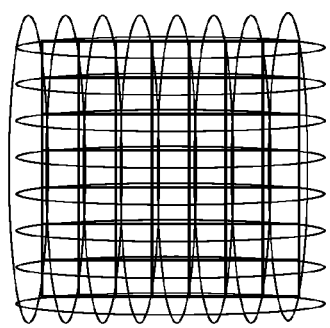
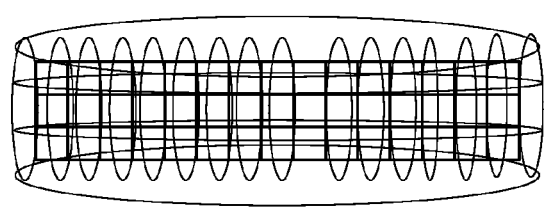
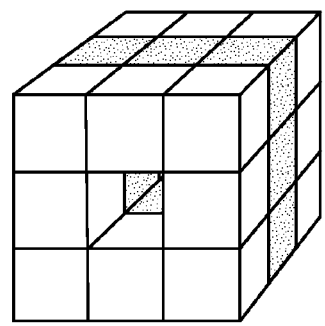
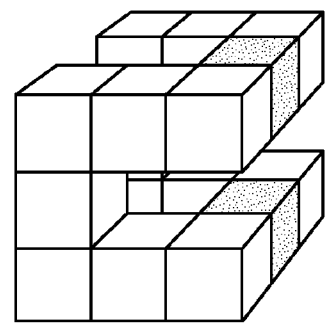
FIG. 3A  FIG. 3B

HIERARCHICAL TASK MAPPING

CROSS-REFERENCE TO RELATED APPLICATIONS

This application claims the benefit of U.S. Provisional Application No. 61/470,232 filed on Mar. 31, 2011, which is incorporated by reference herein in its entirety.

FIELD

The present application relates generally to computers, and computer applications, parallel computing and more particularly to task mapping in parallel computing systems.

BACKGROUND

As the high performance computing systems scale up, mapping the tasks of a parallel application onto physical processors to allow efficient communication becomes one of the challenging problems. Many mapping techniques have been developed to improve the application communication performance. First, graph embedding has been studied and applied to optimize very large scale integrated (VLSI) circuits. See, e.g., John A. Ellis. *Embedding rectangular grids into square grids*. IEEE Trans. Comput., 40(1):46-52, 1991; Rami G. Melhem and Ghil-Young Hwang. *Embedding rectangular grids into square grids with dilation two*. IEEE Trans. Comput., 39(12):1446-1455, 1990. The graph embedding for VLSI circuits tries to minimize the longest path.

Second, space filling curves (See, e.g., *Space-Filling Curves*. Springer-Verlag, 1994) are applied to map parallel programs onto parallel computing systems. The use of space filling curves to improve proximity for mapping is well studied and has found useful in parallel computing. The paper, Masood Ahmed and Shahid Bokhari. *Mapping with space filling surfaces*. IEEE Trans. Parallel Distrib. Syst., 18:1258-1269, September 2007, extends the concept of space filling curves to space filling surfaces. It describes three different classes of space filling surfaces and calculates the distance between facets.

There are methods using graph-partitioning and search-based optimization to solve the mapping problem. For example, G. Bhanot, A. Gara, P. Heidelberger, E. Lawless, J. C. Sexton, and R. Walkup. *Optimizing task layout on the blue gene/l supercomputer*. IBM Journal of Research and Development, 49(2):489-500, March 2005, uses an off-line simulated annealing to explore different mappings on Blue Gene/L™.

The work in Hao Yu, I-Hsin Chung, and Jose Moreira. *Topology mapping for blue gene/l supercomputer*. In SC '06: Proceedings of the 2006 ACM/IEEE conference on Supercomputing, page 116, New York, N.Y., USA, 2006. ACM, developed topology mapping libraries. The mapping techniques are based on folding heuristics. The methods based on folding heuristics require the topologies for guest and host are known already.

Recently, new mapping techniques have been developed. See, e.g., Abhinav Bhatel e, Eric Bohm, and Laxmikant V. Kal e. *A case study of communication optimizations on 3d mesh interconnects*. In Euro-Par '09: Proceedings of the 15th International Euro-Par Conference on Parallel Processing, pages 1015-1028, Berlin, Heidelberg, 2009. Springer-Verlag.

In terms of supporting message passing interface (MPI) topology functions, there are works done for specific systems: Jesper Larsson Traff. *Implementing the mpi process topology mechanism*. In Supercomputing, pages 1-14,2002, uses graph-partitioning based for embedding and Sangman Moh, Chansu Yu, Dongsoo Han, Hee Yong Youn, and Ben Lee. *Mapping strategies for switch-based cluster systems of irregular topology*. In 8th IEEE International Conference on Parallel and Distributed Systems, Kyongju City, Korea, June 2001, describes embedding techniques for switch-based network.

BRIEF SUMMARY

A method for mapping tasks to physical processors in parallel computing system in a hierarchical manner may be provided. In one aspect, a method for mapping tasks to physical processors in parallel computing may include partitioning tasks in the parallel computing system into groups of tasks, the tasks being grouped according to their communication pattern and frequency. The method may also include mapping the groups of tasks to groups of physical processors, respectively. The method may further include fine tuning the mapping of tasks to processors within each of the groups.

A system for mapping tasks to physical processors in parallel computing system, in one aspect, may include a module operable to execute on a processor, and further operable to partition tasks in the parallel computing system into groups of tasks, the tasks being grouped according to their communication pattern and frequency. The module may be further operable to map the groups of tasks to groups of physical processors, respectively. The module may be further operable to fine tune the mapping of tasks to processors within each of the groups.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

BRIEF DESCRIPTION OF THE SEVERAL VIEWS OF THE DRAWINGS

FIGS. 3A and 3B show two examples of mapping 64 tasks into a 4×4×4 cube.

DETAILED DESCRIPTION

Figure 1:
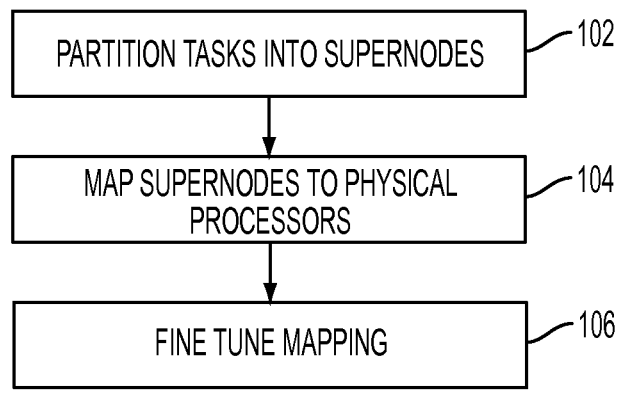
FIG. 1 is a flow diagram illustrating a method of the present disclosure in one embodiment.

In the present disclosure in one embodiment, a hierarchical mapping algorithm is disclosed. The hierarchical mapping algorithm in one embodiment includes partitioning tasks into groups of related tasks, assigning the groups of tasks to groups of physical processors and refining or fine tuning the assignments within each group. A group of tasks are referred to as a supernode.

In one embodiment of the present disclosure, the tasks that are grouped together are related by the frequency of communication among one another. For instance, the hierarchical mapping algorithm may partition the tasks by utilizing a run-time communication matrix to preserve the locality of communication. The algorithm then may extend the Moore's space filling curve on the task partitions for global mapping. Each partition may be further fine tuned using local search method to improve the communication performance.

The method of the present disclosure in one embodiment tries to preserve the locality and reduce the communication time. An example of the method of the present disclosure in one embodiment further extends the efforts of the known methods so the mapping can be handled efficiently on large scale systems while run-time communication performance data is taken into consideration. In one embodiment, the method of the present disclosure may use heuristics with better initial mapping and explore different mappings in parallel in different supernodes. In addition to the folding heuristics, the method of the present disclosure in one embodiment may integrate the run-time measurement into mapping consideration. The methods based on folding heuristics require previous knowledge of the topologies for guest and host. The method of the present disclosure in one embodiment may be based on run-time measurements, which allows mapping to be done more dynamically.

The hierarchical mapping algorithm of the present disclosure in one embodiment may first group nearby tasks that are related, e.g., frequently communicate with each other based on MPI trace collected during run-time, into a "supernode". Similar measurement (e.g., bandwidth and latency) and grouping are done for the physical processors. Then in the global mapping, we apply mapping methods such as the Moore's space filling curve to map the supernodes onto the processor groups on the host machine. After the supernodes are mapped onto the host machine, we swap the tasks within a supernode to explore better mapping configurations (which can be done in parallel). Moore's space filling curve is described in Eliakim Hastings Moore. *On certain crinkly curves*. Transactions of the American Mathematical Society, 1(1):72-90, 1900.

In one embodiment, the local search method described in Jon Kleinberg and Eva Tardos. *Algorithm Design*. Addison-Wesley Longman Publishing Co., Inc., Boston, Mass., USA, 2005, may be used as an optimization technique for swapping tasks within a supernode. The technique is effective in solving NP-hard problems. In one embodiment of the present disclosure, to make the method more efficient, tasks in a supernode are classified into two types: the boundary tasks and the interior tasks. The boundary tasks are selected to maintain the continuity; and the interior tasks are swapped with greedy method to explore possible improvements.

When the number of tasks increases, finding the optimal mapping for those two kinds of problems becomes a challenge since tuning cannot be done by hand. Considering the scalability and the automation, the present disclosure proposes the hierarchical mapping algorithm. In one embodiment, the algorithm may include three parts: the task partition, the global mapping, and the local tuning. In the task partition, the algorithm evenly groups tasks that have strong relations into "supernodes". In the global mapping, those "supernodes" are mapped onto processor groups of the host machine. The mapping is fine tuned locally by optimization methods. Hierarchical mapping in the present disclosure refers to grouping of tasks into supernodes, mapping groups and then fine tuning within a group.

FIG. 1 is a flow diagram illustrating a method of the present disclosure in one embodiment. At 102, tasks are partitioned into groups of tasks, each group into a supernode. At 104, global mapping is performed to assign the partitioned tasks, or supernodes, to physical processors of a host machine or target machine. At 106, the mapping of tasks to processors within a supernode is fine tuned. Each of the steps is explained in further detail below.

Task Partition

The task partition may be done via the analysis of the communication pattern, represented by a matrix, e.g., matrix A where $a_{ij}$ represents the size of data transferred between MPI rank i and j. In MPI programming, rank refers to a unique identifier (ID) given to a task. The matrix may be collected during run-time using a MPI tracing tool such as the one described in H. Wen, S. Sbaraglia, S. Seelam, I. Chung, G. Cong, and D. Klepacki. *A productivity centered tools framework for application performance tuning*. In QEST '07: Proceedings of the Fourth International Conference on the Quantitative Evaluation of Systems (QEST 2007), pages 273-274, Washington, D.C., USA, 2007. IEEE Computer Society. The task partition problem is transformed into the problem of finding the blocks of sparse matrix, for example, described in Richard Vuduc and Hyun-Jin Moon. *Fast sparse matrix-vector multiplication by exploiting variable blocks*. In Proceedings of the International Conference on High-Performance Computing and Communications, 2005. The task partition explores the structure of the nonzero elements. The matrix is partitioned into four submatrices, two in each dimension. If the ratio between nonzero and zero elements in a submatrix exceeds some threshold, the partition stops. Otherwise, the partition will continue recursively, until to some preset block size. This procedure is done automatically.

There are cases when the user with domain knowledge may know the problem properties. Then the task partition can be decided directly by the user. For instance, if there are block structures coming naturally from the problem, then the tasks should be partitioned according to the structure. Another partition example that comes naturally is when the MPI problem uses different MPI communicators for different tasks. This approach gives the user more freedom to choose proper blocks, since a block can be formed by the elements across the entire matrix, not just by the adjacent elements.

Global Mapping

The global mapping works on supernodes in one embodiment of the present disclosure. The dimension of the supernode is used as a unit to measure the dimension of the host machine. For instance, suppose the number of tasks in a supernode is 16, and the topology of host machine is an 8×8×8 cube. If the dimension of a supernode is decided to be 2×2×4, then the problem becomes mapping 32 supernodes onto a 4×4×2 cube.

Figure 2:
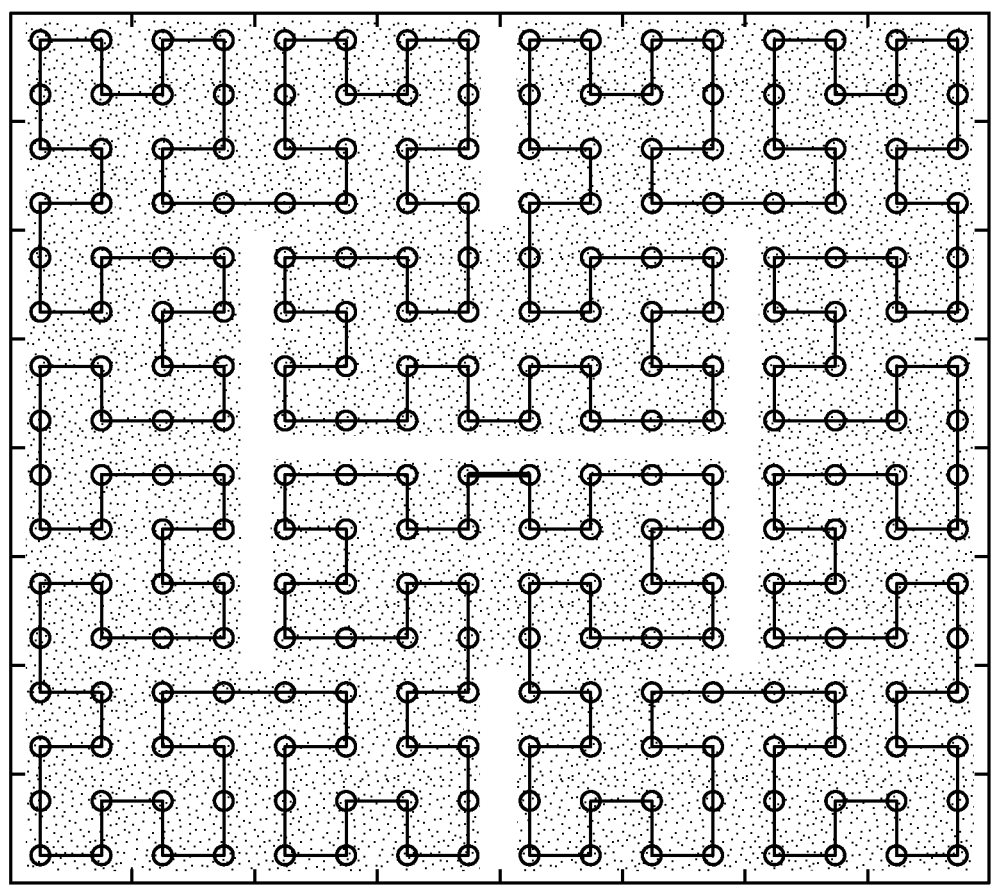
FIG. 2 illustrates an example of the Moore's space filling curve constructed recursively.

For the mapping of a ring or a chain of supernodes to the reduced host machine, the Moore's space filling curve may be used. The space filling curves can be constructed recursively, which means it has hierarchical structure, as shown in FIG. 2. Also, many applications use periodic boundary condition, which makes the communication pattern as a ring or a torus. Moore's space filling curve can map a ring to a square or to a cube, which is more versatile than other kinds of space filling curves. We extend its idea to allow the host space to be rectangular.

High Dimensional Mapping

In this section, we demonstrate how the high dimensional mapping problem can be solved by using the hierarchical mapping algorithm. For the simplicity of illustration, we only use the problem of mapping a two dimensional mesh (or a torus) into a cube as examples. However, this idea can be extended to solve higher dimensional problems.

In the task partition step, the tasks in one side of a mesh (or a torus) are partitioned into a supernode. In the global mapping step, the chain (or the ring) of supernodes is then stuffed into the host machine. The idea is just like rolling the mesh into a tube (or a torus), in which a supernode is formed by the tasks along a circumference, and then to stuff the tube into a box.

FIGS. 3A and 3B show two examples of mapping 64 tasks into a 4×4×4 cube. Each point of intersections of lines (corner) represents a processor. The first example, shown in FIG. 3A, is for an 8×8 torus. When it is rolled into a tube, each supernode is of size 8. If the dimension of a supernode is set to 4×2×1, the problem becomes putting an 8 node long ring onto a 2×4 plane, which can be done straightforwardly. The conceptual mapped torus is shown in FIG. 3A. FIG. 3B shows the example of mapping a 4×16 torus into a 4×4×4 cube. If the mesh is rolled from the short side, it becomes a tube of circumference 4 and 16 supernode long. Since each supernode is of dimension 2×2×1, the global mapping problem becomes stuffing a 16 node long ring into a 2×2×4 cube. Using the space filling curve for three dimensional space, one can obtain the mapping like shown in FIG. 3B.

This mapping approach may encounter problems when the tube is turned around the corner. Similar problems had been studied in Hao Yu, I-Hsin Chung, and Jose Moreira. *Topology mapping for blue gene/l supercomputer*. In SC '06: Proceedings of the 2006 ACM/IEEE conference on Supercomputing, page 116, New York, N.Y., USA, 2006, ACM, in which the nodes around the corners are twisted to minimize the dilation distances. The same technique may be used for that. However, the mapping is further evaluated and improved by optimization methods.

The Local Tuning

The local tuning step of the hierarchical mapping fine tunes the mapping by local swapping. The framework of the local tuning is sketched as follows.

1) Given an initial mapping $\phi$, compute the evaluation function $C(\phi)$.
2) For k=1, 2, . . . until $C(\phi)$ converges
   a) Propose a new $\phi'$.
   b) Evaluate $C(\phi')$.
   c) If $C(\phi') < \rho_k C(\phi)$, $\phi = \phi'$.

In the framework, three things can be varied. The first is the definition of the evaluation function; the second is the method of proposing new $\phi'$; and the third is the decision of the parameter $\rho_k$. Many optimization methods are conformable to this framework, such as the local search algorithm and the simulated annealing method. The idea is to find a better mapping from the existing one. In the present disclosure in one embodiment, we use the simple local search algorithm, which fixes $\rho_k = 1$, and proposes new $\phi'$ by swapping tasks with its neighbors. The used evaluation function $C(\phi)$ is defined as follows.

When the message size of communication is taken into consideration, the dilation distance may not be the best metric for a mapping. Here we propose a new metric, called communication cost, to measure the quality of mappings. The communication cost is composed by two factors: the traffic pattern of tasks and the processor distance.

The traffic pattern of tasks is modeled by a traffic matrix, e.g., matrix T, whose element Ti,j represents the message size sent from task i and task j. The content of matrix T can be obtained from the analysis of programs, in which function calls for communications, such as MPI_SEND or MPI_REDUCE, provides the hints of traffic pattern and message size. A more expensive, but more robust way to obtain T is from measurement of the sample execution of programs.

The processor distance is also represented by a matrix, e.g., matrix D. Element D(i, j) is the cost, which may mean time taken, of sending a unit message from processor i to processor j. A simple model to formulate the matrix D is by the number of links on the shortest path between two processors, which is also called the hopping distance. For more accurate measurement, matrix D can be evaluated via experiments.

With the traffic matrix T and the distance matrix D, the communication cost of a mapping is defined as $$C(\phi) = \sum_{i,j=1}^{n} T(i,j) D(\phi(i), \phi(j)),$$

which is the summation of the communication time over all pairs of tasks mapped to the host machine.

Figure 4:
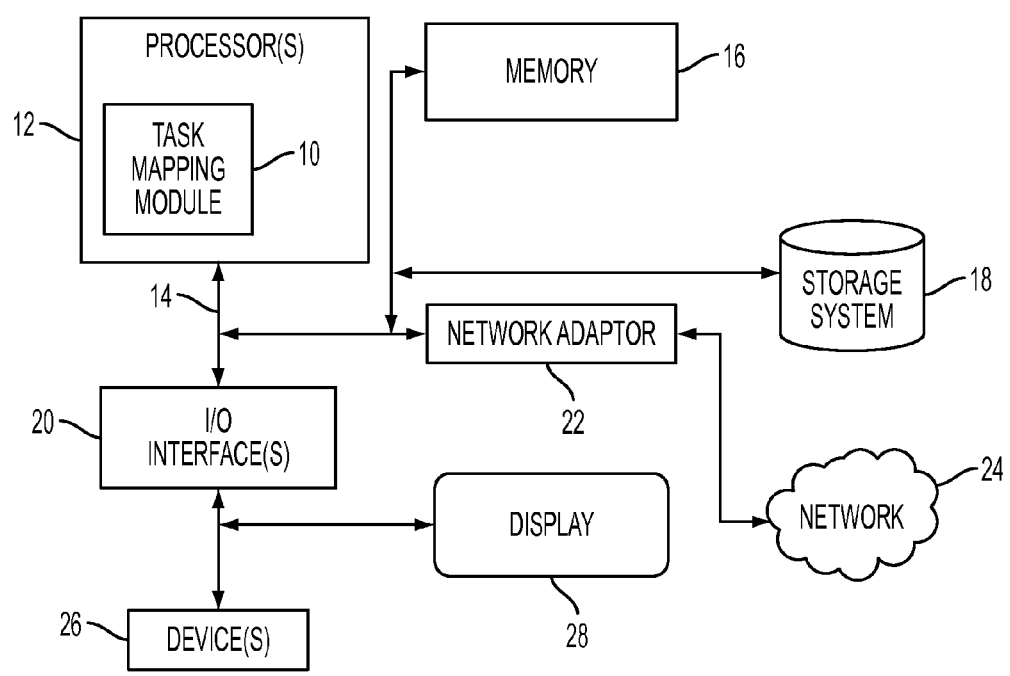
FIG. 4 illustrates a schematic of an example computer or processing system that may implement the task mapping system in one embodiment of the present disclosure.

FIG. 4 illustrates a schematic of an example computer or processing system that may implement the task mapping system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 4 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a ask mapping module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages, a scripting language such as Perl, VBS or similar languages, and/or functional languages such as Lisp and ML and logic-oriented languages such as Prolog. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The computer program product may comprise all the respective features enabling the implementation of the methodology described herein, and which—when loaded in a computer system—is able to carry out the methods. Computer program, software program, program, or software, in the present context means any expression, in any language, code or notation, of a set of instructions intended to cause a system having an information processing capability to perform a particular function either directly or after either or both of the following: (a) conversion to another language, code or notation; and/or (b) reproduction in a different material form.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Various aspects of the present disclosure may be embodied as a program, software, or computer instructions embodied in a computer or machine usable or readable medium, which causes the computer or machine to perform the steps of the method when executed on the computer, processor, and/or machine. A program storage device readable by a machine, tangibly embodying a program of instructions executable by the machine to perform various functionalities and methods described in the present disclosure is also provided.

The system and method of the present disclosure may be implemented and run on a general-purpose computer or special-purpose computer system. The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server. A module may be a component of a device, software, program, or system that implements some "functionality", which can be embodied as software, hardware, firmware, electronic circuitry, or etc.

The embodiments described above are illustrative examples and it should not be construed that the present invention is limited to these particular embodiments. Thus, various changes and modifications may be effected by one skilled in the art without departing from the spirit or scope of the invention as defined in the appended claims.

We claim:

1. A method of mapping tasks to physical processors in parallel computing system, comprising:
    partitioning tasks in the parallel computing system into groups of tasks, the tasks being grouped according to their communication pattern and frequency;
    partitioning physical processors into groups of physical processors based at least on bandwidth and latency of said physical processors, each of the groups of physical processors having a defined dimension based on said each of the groups of tasks;
    mapping, by a processor, the groups of tasks to the groups of physical processors, respectively;
    mapping, by the processor, the groups of physical processors having the defined dimension into a host machine using a space filling technique; and
    fine tuning, by the processor, the mapping of tasks within a group of tasks to processors within a respectively mapped group of physical processors, the fining tuning based at least on traffic pattern of the tasks within a group of tasks and distance of the processors within a respectively mapped group of physical processors, the fine tuning performed iteratively until a cost defined by the traffic pattern and the distance converges.

2. The method of claim 1, wherein the partitioning is performed by utilizing a run-time communication matrix collected during run-time of the tasks, based on message passing interface communications occurring among the tasks, wherein the partitioning preserves locality of communication among the tasks.

3. The method of claim 2, wherein the tasks that communicated with one another a predetermined number of times are partitioned into same group.

4. The method of claim 1, wherein the tasks in each of the groups are classified into boundary tasks and interior tasks, wherein the boundary tasks are selected to maintain continuity of communication among said groups of tasks, and wherein the interior tasks can be swapped in fine tuning the mapping of tasks to processors.

5. The method of claim 1, wherein the mapping can be performed based on Moore's space filling curve technique.

6. The method of claim 1, wherein the fine tuning includes swapping assignment of tasks to physical processors.

7. The method of claim 6, wherein the swapping is performed based on a local search method, wherein the tasks are classified into boundary tasks and interior tasks, the boundary tasks selected to maintain continuity and the interior tasks are swapped based on a greedy algorithm.

8. The method of claim 7, wherein communication cost of mapping including summation of communication time over all pairs of tasks is used to determine swapping.

9. The method of claim 8, wherein said communication cost is determined based on runtime measurements of the tasks.

10. A non-transitory computer readable storage medium storing a program of instructions executable by a machine to perform a method of mapping tasks to physical processors in parallel computing system, comprising:
    partitioning tasks in the parallel computing system into groups of tasks, the tasks being grouped according to their communication pattern and frequency;
    partitioning physical processors into groups of physical processors based at least on bandwidth and latency of said physical processors, each of the groups of physical processors having a defined dimension based on said each of the groups of tasks;
    mapping, by a processor, the groups of tasks to the groups of physical processors, respectively;
    mapping, by the processor, the groups of physical processors having the defined dimension into a host machine using a space filling technique; and
    fine tuning, by the processor, the mapping of tasks within a group of tasks to processors within a respectively mapped group of physical processors, the fining tuning based at least on traffic pattern of the tasks within a group of tasks and distance of the processors within a respectively mapped group of physical processors, the fine tuning performed iteratively until a cost defined by the traffic pattern and the distance converges.

11. The non-transitory computer readable storage medium of claim 10, wherein the partitioning tasks is performed by utilizing a run-time communication matrix collected during run-time of the tasks, based on message passing interface communications occurring among the tasks, wherein the partitioning preserves locality of communication among the tasks.

12. The non-transitory computer readable storage medium of claim 11, wherein the tasks that communicated with one another a predetermined number of times are partitioned into same group.

13. The non-transitory computer readable storage medium of claim 10, wherein the tasks in each of the groups are classified into boundary tasks and interior tasks, wherein the boundary tasks are selected to maintain continuity of communication among said groups of tasks, and wherein the interior tasks can be swapped in fine tuning the mapping of tasks to processors.

14. The non-transitory computer readable storage medium of claim 10, wherein the mapping can be performed based on Moore's space filling curve technique.

15. The non-transitory computer readable storage medium of claim 10, wherein the fine tuning includes swapping assignment of tasks to physical processors.

16. The non-transitory computer readable storage medium of claim 15, wherein the swapping is performed based on a local search method, wherein the tasks are classified into boundary tasks and interior tasks, the boundary tasks selected to maintain continuity and the interior tasks are swapped based on a greedy algorithm.

17. The non-transitory computer readable storage medium of claim 16, wherein communication cost of mapping including summation of communication time over all pairs of tasks is used to determine swapping.

18. The non-transitory computer readable storage medium of claim 17, wherein said communication cost is determined based on runtime measurements of the tasks.

19. A system for mapping tasks to physical processors in parallel computing system, comprising:
    a processor;
    a module operable to execute on the processor, and further operable to partition tasks in the parallel computing system into groups of tasks, the tasks being grouped according to their communication pattern and frequency, the module further operable to partition physical processors into groups of physical processors based at least on bandwidth and latency of said physical processors, each of the groups of physical processors having a defined dimension based on said each of the groups of tasks, the module further operable to map the groups of tasks to the groups of physical processors, respectively, the module further operable to map the groups of physical processors having the defined dimension into a host machine using a space filling technique, the module further operable to fine tune the mapping of tasks within a group of tasks to processors within a respectively mapped group of physical processors, the fining tuning based at least on traffic pattern of the tasks within a group of tasks and distance of the processors within a respectively mapped group of physical processors, the fine tuning performed iteratively until a cost defined by the traffic pattern and the distance converges.

20. The system of claim 19, wherein the module partitions the tasks by utilizing a run-time communication matrix collected during run-time of the tasks, based on message passing interface communications occurring among the tasks, wherein the partitioning preserves locality of communication among the tasks.

21. The system of claim 19, wherein the tasks in each of the groups are classified into boundary tasks and interior tasks, wherein the boundary tasks are selected to maintain continuity of communication among said groups of tasks, and wherein the interior tasks can be swapped in fine tuning the mapping of tasks to processors.

22. The system of claim 19, wherein the fine tuning includes swapping assignment of tasks to physical processors.

23. The system of claim 22, wherein communication cost of mapping including summation of communication time over all pairs of tasks is used to determine swapping.

24. The system of claim 23, wherein said communication cost is determined based on runtime measurements of the tasks.

* * * * *